United States Patent
Ota et al.

(10) Patent No.: US 6,728,042 B2
(45) Date of Patent: Apr. 27, 2004

(54) OPTICAL PICK-UP DEVICE AND OBJECTIVE LENS USED THEREIN

(75) Inventors: Kohei Ota, Hachioji (JP); Norikazu Arai, Hachioji (JP)

(73) Assignee: Konica Corporation, Tokyo (JP)

( * ) Notice: Subject to any disclaimer, the term of this patent is extended or adjusted under 35 U.S.C. 154(b) by 74 days.

(21) Appl. No.: 10/126,783

(22) Filed: Apr. 22, 2002

(65) Prior Publication Data

US 2003/0021038 A1 Jan. 30, 2003

(30) Foreign Application Priority Data

Apr. 26, 2001 (JP) ........................................ 2001-129048

(51) Int. Cl.[7] .............................................. G11B 7/135
(52) U.S. Cl. ........................ 359/637; 359/719; 359/634; 369/112.03
(58) Field of Search ...................... 369/112.03, 112.01; 359/618, 634, 637, 719

(56) References Cited

U.S. PATENT DOCUMENTS 6,272,096 B2 * 8/2001 Yoo et al. .............. 369/112.01
6,304,540 B1 * 10/2001 Yoo et al. .............. 369/112.01
6,392,977 B2 * 5/2002 Ando et al. ............ 369/112.01

* cited by examiner

Primary Examiner—Georgia Epps
Assistant Examiner—Darryl J. Collins
(74) Attorney, Agent, or Firm—Finnegan, Henderson, Farabow, Garrett & Dunner, L.L.P.

(57) ABSTRACT

An optical pickup apparatus comprises two light sources having two wavelengths ($\lambda1<\lambda2$) and a converging optical system having an objective lens. The objective lens comprises a central region; a peripheral region provided at an outside of the central region on at least one optical surface of the objective lens; a diffractive ring-shaped zones which is blazed on a basis of a wavelength $\lambda0$ ($\lambda1<\lambda0<\lambda2$) and is formed on each of the central region and the peripheral region; and a phase difference suppressing structure to suppress a phase difference between a wavefront of a light flux passing the central region and a wavefront of a light flux passing the peripheral region when recording or reproducing information is conducted for the first optical information recording medium.

16 Claims, 5 Drawing Sheets

FIG. 1 (a)

POSITION OF INCIDENT LIGHT FOR NA0.47

FIG. 1 (b)

AVERAGE WAVE FRONT ABERRATION ON DIFFRACTIVE RING-SHAPED ZONE

NA
0.6
0.47
0.10λ
WAVE FRONT ABERRATION

FIG. 2 (a)

POSITION OF INCIDENT LIGHT FOR NA0.47

FIG. 2 (b)

AVERAGE WAVE FRONT ABERRATION ON DIFFRACTIVE RING-SHAPED ZONE

NA
0.6
0.47
0.10λ
WAVE FRONT ABERRATION

OPTICAL PICK-UP DEVICE AND OBJECTIVE LENS USED THEREIN

BACKGROUND OF THE INVENTION

The present invention relates, to an optical pick-up device and an objective lens used therein, for example, to an optical pick-up device which can perform information recording and/or information reproduction for two optical information recording media each having a different thickness of a transparent base board and an objective lens used therein.

With the practical use of a short wave red semiconductor laser in recent years, there has been developed a high density optical disk DVD (digital video disk) that is the same in size as a conventional optical disk CD (compact disk) representing an information recording medium, and has a larger capacity. In order to attain high density of a recording signal, it is requested to make a spot formed on a recording medium by an objective lens to be smaller in an optical system of an optical information recording/reproducing device employing such an optical disk. Therefore, there are the facts that a wavelength of a laser representing a light source is made to be shorter and a numerical aperture of an objective lens is made to be higher.

For example, in an optical pick-up device that performs information recording and/or reproduction for DVD, when a short wave semiconductor laser ray having a wavelength of about 650 nm is used as a light source, numerical aperture NA closer to the optical disk is approximately 0.6 for the objective lens that converges the laser ray. Incidentally, in CD and DVD, there are optical disks under various kinds of standards, including, for example, CD-R (write-once read-many compact disk), and in addition to CD and DVD, there is MD (mini disk) that has been commercialized and has become popular.

On the other hand, in the optical pick-up device that performs information recording and/or reproduction for CD-R, it is necessary to use the light source having a wavelength of about 780 nm. For the other optical disks, it is possible to use the light source having a wavelength other than the specific wavelength. In this case, a necessary numerical aperture NA can be changed in accordance with the wavelength $\lambda$ of the light source used therein. For example, the necessary numerical aperture is NA=$\lambda$ ($\mu$m)/1.73 approximately for CD, while the necessary numerical aperture is NA=$\lambda$ ($\mu$m)/1.06 approximately for DVD. The numerical aperture in the present specification means a numerical aperture of the converging optical system viewed from the optical disk side. The necessary numerical aperture means a numerical aperture that is calculated by both spot size d required on the recording surface of the optical disk and wavelength $\lambda$ in use, and that is commonly shown by the formula NA=0.83×$\lambda$/d.

As mentioned above, in the market, there exist various kinds of the optical disks having different transparent base board thicknesses, different recording densities and different wavelengths in use. However it is too heavy a burden for the user to purchase the exclusive information recording and reproduction device which can perform information recording and/or reproduction for each optical disk. Therefore, there is proposed the information recording/reproduction device provided with the interchangeable optical pick-up device that can cope with the various optical disks.

In such an optical disk, when light fluxes each having a different wavelength are made to enter the base boards each having a different thickness, it is necessary to correct spherical aberration to be the prescribed value or less, and to control a spot diameter of each light flux to be within the prescribed range, in order to perform information writing and reading properly.

As a solution for the foregoing, there is proposed the optical pick-up device wherein converging optical systems are provided for different optical disks respectively, and optical converging systems are switched in accordance with the optical disks to be reproduced. The optical pick-up device mentioned above makes it possible to correct the spherical aberration to be under the prescribed value, and to make the spot diameter of each light flux to be within the prescribed range, when the light fluxes having different wavelengths are incident on the base boards having different thicknesses. However, this optical pick-up device requires a plurality of light converging optical systems, to cause the complicated structure and higher cost, which is not preferable.

For this problem, there is developed an objective lens having a diffractive structure that can converge the light flux passing within the prescribed numerical aperture to spot light and that can make the light flux passing beyond the prescribed numerical aperture to be flared light. This objective lens can obtain spot light having a necessary diameter for the information recording or reproduction for the various optical information recording media such as, for example, CD and DVD.

Here, in the objective lens having the diffractive structure stated above, wave front aberration caused by the difference of the wavelength of the light source is generated originally, because the light flux having the numerical aperture smaller than the prescribed numerical aperture is used for the information recording or reproduction for the various optical information recording media such as CD and DVD commonly. Accordingly, it is necessary to make the characteristic of the wave front aberration to be better by some means. Further, there is request to increase the spot light amount for the optical information recording media having thick base board such as CD.

SUMMARY OF THE INVENTION

The object of the present invention is to provide the optical pick-up device and the objective lens which can control a phase shift of a wave front, in the objective lens which is used for the information recording or reproduction for the various optical information recording media such as CD and DVD commonly.

The object of the present invention is to provide the optical pick-up device and the objective lens which have the better characteristic of the wave front aberration, in the objective lens which is used for the information recording or reproduction for the various optical information recording media such as CD and DVD commonly.

Further, the object of the present invention is to provide the optical pick-up device and the objective lens which can increase the spot light amount, for the optical information recording medium such as CD having the thick base board, in the objective lens which is used for the information recording or reproduction for the various optical information recording media such as CD and DVD commonly.

An optical pick-up device has a first light source having wavelength $\lambda 1$, a second light source having wavelength $\lambda 2$ ($\lambda 1 < \lambda 2$) and a converging optical system including an objective lens which converges the light fluxes emitted from the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for tile second optical information recording medium whose transparent base board thickness is $t_2$ ($t_1<t_2$), by using the second light source and the converging optical system, wherein when NA1 is a first necessary numerical aperture of the objective lens which performs the information recording and/or reproduction for the first optical information recording medium, using the first light source and tile converging optical system, and when NA2 (NA1<NA2) is a second necessary numerical aperture of the objective lens which performs the information recording and/or reproduction for the second optical information recording medium, using the second light source and at the converging optical system, at least one optical surface of the objective lens is provided with a central area which is from an optical axis to a prescribed distance corresponding to the second necessary numerical aperture NA2, and with a peripheral area which is outside the prescribed distance, and on the central area and the peripheral area, there are formed the diffractive structures having the diffractive ring-shaped zones blazed concerning the wavelength $\lambda 0$ ($\lambda 1<\lambda 0<\lambda 2$), and wherein when the information recording and/or reproduction is performed for the first optical information recording medium, controlled is the phase shift (phase difference) between the wave front of the light flux passing through the central area and the wave front of the light flux passing through the peripheral area. The present invention is explained as follows.

Figure 1:
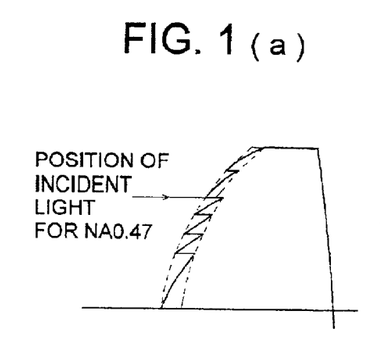
FIG. 1(a) is a schematic section in the optical axial direction of the objective lens, shown as the comparative example.
FIG. 1(b) is a drawing showing illustratively the wave front aberration of the objective lens shown as the comparative example, caused in the case of performing the information recording and/or reproduction for the first optical information recording medium.

FIG. 1(a) is a schematic section in the optical axial direction of the objective lens, shown as a comparative example. FIG. 1(b) is a drawing showing illustratively the wave front aberration of the objective lens representing the comparative example, in the case of performing the information recording and/or reproduction for the first optical information recording medium. Since the phase shift equivalent to integer multiples of $2\pi$ in the wave front aberration does not affect an image formation, the phase shift is excluded from the wave front aberration. The second necessary numerical aperture NA2 is 0.47 in this case. In the objective lens shown as the comparative example, since the peripheral area whose second necessary numerical aperture NA2 is equal to or greater than 0.47 is an exclusive area where the light flux performing the information recording and/or reproduction for the first optical information recording medium passes through, the blazing wavelength can be equal to the light wavelength in a practical use, accordingly, it is possible to keep the wave front aberration to be constant, in principle. However, in the central area whose necessary numerical aperture NA2 is equal to or less than 0.47, in order to obtain the adequate diffractive efficiency for both of the first and second optical information recording media, it is necessary to make the blazing wavelength for forming the diffractive ring-shaped zone to be different from the light wavelength in a practical use, and therefore, when the information recording and/or reproduction is performed for the first optical information recording medium, the phase shift of about 0.05 $\lambda 1$ is caused between the wave front of the light flux passing through the central area and the wave front of the light flux passing through the peripheral area.

In order to dissolve the phase shift, the central area and the peripheral area form the diffractive structures having blazed diffractive ring-shaped zones concerning the wave length $\lambda 0$ ($\lambda a<\lambda 0<\lambda 2$), in an objective lens of an optical pick-up device. Here, to blaze concerning the wavelength $\lambda 0$ means to design the diffractive ring-shaped zone so that diffractive efficiency may be raised to the highest level at the wavelength $\lambda 0$.

Figure 2:
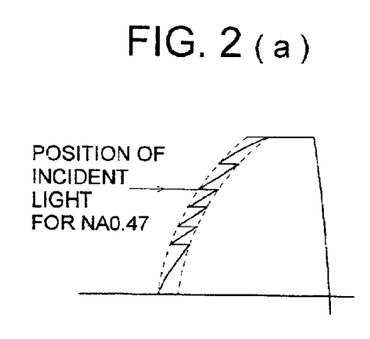
FIG. 2(a) is a schematic section in the optical axial direction of the objective lens of the optical pick-up device of the present invention.
FIG. 2(b) is a drawing showing illustratively the wave front aberration of the objective lens of the optical pick-up device of the invention, caused in the case of performing the information recording and/or reproduction for the first optical information recording medium.

FIG. 2(a) is a schematic section in the optical axial direction of the objective lens of the optical pick-up device of the present invention. FIG. 2(b) is a drawing showing illustratively the wave front aberration of the objective lens of the optical pick-up device of the invention, in the case of performing the information recording and/or reproduction for the first optical information recording medium.

As understood from FIG. 2(b), it is possible to make the average value of the wave front aberration in the peripheral area to be equal to the average value of the wave front aberration in the central area practically, by forming the diffractive structures having the diffractive ring-shaped zones blazed concerning the wavelength $\lambda 0$ on both of the central area and the peripheral area, though the wave front aberration according to the shape of the ring-shaped zone is caused on the peripheral area. By setting the average values of the wave front aberrations to be equal each other mentioned above, the phase shift becomes 0 approximately or less than 0.05 $\lambda 1$, which can improve the wave front aberration.

In an optical pick-up device, there is a step generated in the optical axial direction, between an imaginary enveloping surface which is formed by jointing the crests in the direction of the optical axis of the diffractive ring-shaped zone of the central area and an imaginary enveloping surface which is formed by jointing the crests in the direction of the optical axis of the diffractive ring-shaped zone of the peripheral area, and the step is not less than 1 μm and not grater than 10 μm, therefore, when the information recording and/or reproduction is performed for the first optical information recording medium, for example, by providing the step which makes the light path difference to be equivalent to the integer multiples of the wave length $\lambda 1$, the characteristic of the change of the aberration for temperature changes can be improved without affecting the phase shift.

In an optical pick-up device, when the information recording and/or reproduction is performed for the first optical recording medium, it is preferable if the phase shift between the wave front of the light flux passing through the central area and the wave front of the light flux passing through the peripheral area is 0.05 $\lambda 1$ or less.

An optical pick-up device has a first light source having wavelength $\lambda 1$, a second light source having wavelength $\lambda 2$ ($\lambda 1<\lambda 2$) and a converging optical system including an objective lens which converges the light fluxes emitted from the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness if $t_2$ ($t_1<t_2$), by using the second light source and the converging optical system, wherein when NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area, there is formed the central diffractive structure having the diffractive ring-shaped zone blazed concerning the light flux having the wavelength $\lambda 0$ ($\lambda 1 < \lambda 0 < \lambda 2$), and on the peripheral area, there is formed the peripheral diffractive structure having the diffractive ring-shaped zone blazed concerning the light flux having wavelength $\lambda 0'$ ($\lambda 0' < \lambda 0$), wherein the imaginary enveloping surface which is formed by jointing the crests directed to the optical axis of the diffractive ring-shaped zone of the central area is discontinuous with the imaginary enveloping surface which is formed by jointing the crests directed to the optical axis of the diffractive ring-shaped zone of the peripheral area, and wherein controlled is the phase shift between the wave front of the light flux passing through the central area and the wave front of the light flux passing through the peripheral area. The present invention is explained as follows.

Figure 3A:
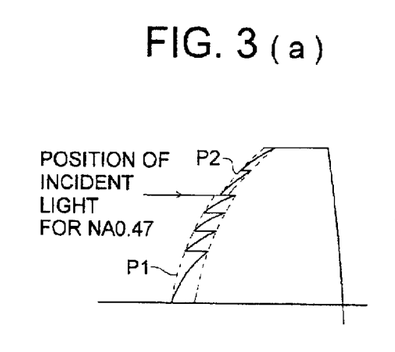
FIG. 3(a) is a schematic section in the optical axial direction of the objective lens of the optical pick-up device of the invention.
Figure 3B:
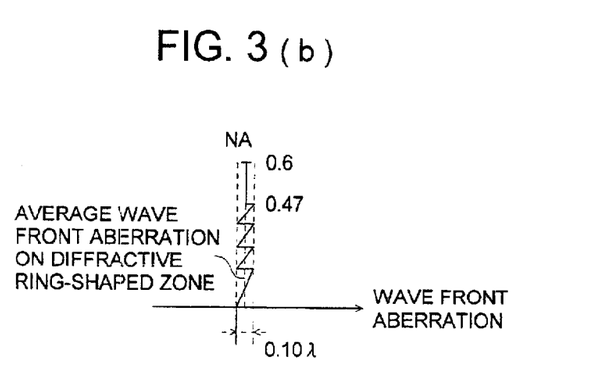
FIG. 3(b) is a drawing showing illustratively the wave front aberration of the objective lens of the optical pick-up device of the invention, caused in the case of performing the information recording and/or reproduction for the first optical information recording medium.

FIG. 3(a) is a schematic section in the optical axial direction of the objective lens of the optical pick-up device of the invention. FIG. 3(b) is a drawing showing illustratively the wave front aberration of the objective lens of the optical pick-up device of the invention, in the case of performing the information recording and/or reproduction for the first optical information recording medium.

For the peripheral area whose second necessary numerical aperture NA2 is not less than 0.47, it is possible to keep the wave front aberration constant, by equalizing the blazing wavelength with the wavelength in use as shown in the upper part of FIG. 3(b). Further, for the central area whose second necessary numerical aperture NA2 is not greater than 0.47, it is possible to make the characteristic of the wave front aberration better, by bringing the average wave front closer to the average wave front in the peripheral area, (see the lower part in FIG. 3(b)), by making imaginary enveloping surface P1 which is formed by jointing the crests directed to the optical axis of the diffractive ring-shaped zone of the central area to be discontinuous with imaginary enveloping surface P2 which is formed by jointing the crests directed to the optical axis of the diffractive ring-shaped zone of the peripheral area.

In an optical pick-up device, there is a step generated in the optical axial direction, between an imaginary enveloping surface which is formed by jointing the crests in the direction of the optical axis of the diffractive ring-shaped zone of the central diffractive structure and an imaginary enveloping surface which is formed by jointing the crests in the direction of the optical axis of the diffractive ring-shaped zone of the peripheral diffractive structure, and the step is not less than 1 $\mu$m and not greater than 10 $\mu$m, therefore, when the information recording and/or reproduction is performed for the first optical information recording medium, for example, by providing the step which makes the light path difference to be equivalent to integer multiples of the wave length $\lambda 1$, the characteristic of the change of the aberration for temperature changes can be improved without affecting the phase shift.

In an optical pick-up device, when the information recording and/or reproduction is performed for the first optical recording medium, it is preferable if the phase shift between tile wave front of the light flux passing through the central area and the wave front of the light flux passing through the peripheral area is 0.05 $\lambda 1$ or less.

An optical pick-up device has a first light source having wavelength $\lambda 1$, a second light source having wavelength $\lambda 2$ ($\lambda 1 < \lambda 2$) and a converging optical system including an objective lens which converges the light fluxes emitted from the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness is $t_2$ ($t_1 < t_2$), by using the second light source and the converging optical system, wherein when NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area, there is formed the central diffractive structure having the diffractive ring-shaped zone blazed concerning the light flux having the wavelength $\lambda 0$ ($\lambda 1 < \lambda 0 < \lambda 2$), and wherein lightened is at least either one of the wave front aberration generated by the difference between the light source wavelength $\lambda 1$ and the blazing wavelength $\lambda 0$, when the information recording and/or reproduction is performed for the first optical information recording medium, and the wave front aberration generated by the difference between the light source wavelength $\lambda 2$ and the blazing wavelength $\lambda 0$, when the information recording and/or reproduction is performed for the second optical information recording medium. The invention will be explained as follows.

The invention is attained in order to improve the minute wave front aberration, that is generated by the difference of the blazing wavelength and the wavelength in use in each of the diffractive ring-shaped zone. If there is the wave front aberration of low order power of the aperture in the objective lens for the optical pick-up, it is generally said that the characteristics of a jitter signal and others become worse. Accordingly, when the wave front aberration generated by the difference between the blazing wavelength and the wavelength in use is expressed by the power series of NA, it is desirable to design the third-order spherical aberration and the fifth-order spherical aberration which have been corrected beforehand. A designing technique which controls the third-order or higher order spherical aberrations concretely is the incorporation of the low-order wave front aberration in advance, which is generated by the difference between the blazing wavelength and the wavelength in use, into the design, when the pitch of the ring-shaped zone and the macroscopic aspheric surface are designed. Especially, the diffractive ring-shaped zone of the central diffractive structure including the optical axis has a large area, where the low-order spherical aberration is easily generated, which must be considered as the important matter.

An optical pick-up device has a first light source having wavelength $\lambda 1$, a second light source having wavelength $\lambda 2$ ($\lambda 1 < \lambda 2$) and a converging optical system including an objective lens which converges the light fluxes emitted form the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness is $t_2$ ($t_1 < t_2$), by using the second light source and the converging optical system, wherein the NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area and the peripheral area, there are formed the diffractive structures provided with the diffractive ring-shaped zones, and wherein the diffractive structure of the central area and at least the diffractive structure of the peripheral area contacting the central area are blazed concerning the wavelength $\lambda 0$ ($\lambda 1 < \lambda 0 < \lambda 2$). The invention will be explained as follows.

When the recording and/or reproduction is performed at high speed for the second optical information recording medium such as CD, it is necessary to converge a large amount of light by the objective lens. However, the increase of the numerical aperture NA (NA2 in this case) of the area (the central area in this case) where the aberration is to be corrected causes the too small beam and the bad influence such as the deterioration of the tolerance. Accordingly it is required to increase spot light amount, without increasing the numerical aperture NA of the area where the aberration is to be corrected. As a result of the investigation by the inventers for the present invention, it is understood that the area (the peripheral area in this case) which is not used for the information recording and/or reproduction for the second optical information recording medium, such as the area where the aberration is not corrected and the flare is generated, can contribute to the light amount of the spot for the information recording and/or reproduction for the second optical information recording medium. Based on the result of the investigation, by blazing the diffractive structure in the central area and at least the diffractive structure of the peripheral area contacting the central area, concerning the light flux having wavelength $\lambda 0$, the invention can obtain the large light amount of the spot, to perform the information recording and/or reproduction for the second optical information recording medium.

Here, by equalizing the blazing wavelength $\lambda 0$ of the peripheral area to the wavelength $\lambda 1$ used for the first optical information recording medium, it is possible to obtain the higher diffractive efficiency of the diffractive structure in the peripheral area for the first optical information recording medium, however, the diffractive efficiency becomes lower for the wavelength $\lambda 2$ used for the second optical information recording medium. Therefore, the blazing wavelength of the diffractive structure in the area (near the border to the central area in the peripheral area, that is, the area contacting the central area) whose numerical aperture NA is relatively small, for example, NA is 0.47 to 0.52 in the peripheral area, is equalized to the blazing wavelength of the diffractive structure in the central area, then, the diffractive efficiency concerning the light flux having wavelength $\lambda 2$ becomes large for this area, and it is possible to obtain large amount of light flux for the information recording and/or reproduction for the second optical information recording medium.

An objective lens of an optical pick-up device has a first light source having wavelength $\lambda 1$, a second light source having wavelength $\lambda 2$ ($\lambda 1 < \lambda 2$) and a converging optical system including an objective lens which converges the light fluxes emitted from the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness is $t_2$ ($t_1 < t_2$), by using the second light source and the converging optical system, wherein when NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area and the peripheral area, there are formed the diffractive structures having the diffractive ring-shaped zones blazed concerning the wavelength $\lambda 0$ ($\lambda 1 < \lambda 0 < \lambda 2$), and wherein when the information recording and/or reproduction is performed for the first optical information recording medium, controlled is the phase shift between the wave front of the light flux passing through the central area and the wave front of the light flux passing through the peripheral area.

In an objective lens of an optical pick-up device, there is a step generated in the optical axial direction, between an imaginary enveloping surface which is formed by jointing the crests directed to the optical axis of the diffractive ring-shaped zone of the central area and an imaginary enveloping surface which is formed by jointing the crests directed to the optical axis of the diffractive ring-shaped zone of the peripheral area, and the step is not less than 1 $\mu$m and not greater than 10 $\mu$m.

In an objective lens of an optical pick-up device, when the information recording and/or reproduction is performed for the first optical recording medium, the phase shift between the wave front of the light flux passing through the central area and the wave front of the light flux passing through the peripheral area is 0.05 $\lambda 1$ or less.

An objective lens of an optical pick-up device has a first light source having wavelength $\lambda 1$, a second light source having wavelength λ2 (λ1<λ2) and a converging optical system including an objective lens which converges the light fluxes emitted from the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness is $t_2$ ($t_1<t_2$), by using the second light source and the converging optical system, wherein when NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area, there is formed the central diffractive structure having the diffractive ring-shaped zone blazed concerning the light flux having the wavelength λ0 (λ1<λ0<λ2), and on the peripheral area, there is formed the peripheral diffractive structure having the diffractive ring-shaped zone blazed concerning the light flux having wavelength λ0' (λ0'<λ0), wherein the imaginary enveloping surface which is formed by jointing the crests directed to the optical axis of the diffractive ring-shaped zone of the central area is discontinuous with the imaginary enveloping surface which is formed by jointing the crests directed to the optical axis of the diffractive ring-shaped zone of the peripheral area, and where in controlled is the phase shift between the wave front of the light flux passing through the central area and the wave front of the light flux passing through the peripheral area.

In an objective lens of an optical pick-up device, there is a step generated in the optical axial direction, between an imaginary enveloping surface which is formed by jointing the crests directed to the optical axis of the diffractive ring-shaped zone of the central diffractive structure and an imaginary enveloping surface which is formed by jointing the crests directed to the optical axis of the diffractive ring-shaped zone of the peripheral diffractive structure, and the step is not less than 1 μm and not greater than 10 μm.

In an objective lens of an optical pick-up device, when the information recording and/or reproduction is performed for the first optical recording medium, the phase shift between the wave front of the light flux passing through the central area and the wave front of the light flux passing through the peripheral area is 0.05 λ1 or less.

An objective lens of an optical pick-up device has a first light source having wavelength λ1, a second light source having wavelength λ2 (λ1 λ2) and a converging optical system including an objective lens which converges the light fluxes emitted from the first light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness is $t_2$ ($t_1<t_2$), by using the second light source and the converging optical system, wherein when NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area, there is formed the central diffractive structure having the diffractive ring-shaped zone blazed concerning the light flux having the wavelength λ0 (λ1<λ0<λ2), and wherein lightened is at least either one of the wave front aberration generated by the difference between the light source wavelength λ1 and the blazing wavelength λ0, when the information recording and/or reproduction is performed for the first optical information recording medium, and the wave front aberration generated by the difference between the light source wavelength λ2 and the blazing wavelength λ0, when the information recording and/or reproduction is performed for the second optical information recording medium.

An objective lens of an optical pick-up device has a first light source having wavelength λ1, a second light source having wavelength λ2 (λ1<λ2) and a converging optical system including an objective lens which converges the light fluxes emitted from the First light source and the second light source onto an information recording surface of the optical information recording medium, and being capable of performing the information recording and/or reproduction for the first optical information recording medium whose transparent base board thickness is $t_1$, by using the first light source and the converging optical system, and being capable of performing the information recording and/or reproduction for the second optical information recording medium whose transparent base board thickness is $t_2$ ($t_1<t_2$), by using the second light source and the converging optical system, wherein when NA1 is a first necessary numerical aperture of the objective lens which performs the information recording and/or reproduction for the first optical information recording medium, using the first light source and the converging optical system, and when NA2 (NA1<NA2) is a second necessary numerical aperture of the objective lens which performs the information recording and/or reproduction for the second optical information recording medium, using the second light source and the converging optical system, at least one optical surface of the objective lens is provided with a central area which is from an optical axis to a prescribed distance corresponding to the second necessary numerical aperture NA2, and is provided with a peripheral area which is outside the prescribed distance, and on the central area and the peripheral area, there are formed the diffractive structures provided with the diffractive ring-shaped zones, and wherein the diffractive structure of the central area and the diffractive structure positioned at least contacting with the central area are blazed concerning the wavelength λ0 (λ1<λ0<λ2).

The "diffractive structure" used in the present specification means the section which is provided with relief on the surface of the objective lens and has the function to converge or diverge the light flux by diffraction. Concerning the form of relief, as shown in FIG. 2(a), for example, there is known the shape wherein ring-shaped zones are formed to be the concentric circles around the optical axis representing the center, and when its section on a plane including an optical axis is viewed, each ring-shaped zone is like the saw-tooth. The form of relief includes above-mentioned shape, and this shape is named "the diffractive ring-shaped zone" especially.

In the present specification, in a narrow sense, the objective lens means the lens having light converging function and being arranged to face the optical information recording medium at the closest position to the optical information recording medium, under the condition that the optical information recording medium is installed on the optical pick-up device. In a wide sense, the objective lens means the lens group which can be moved by an actuator together with the lens at least in the direction of the optical axis of the lens. Here, such lens group means at least one or more lens pieces (for example, two pieces). Accordingly, in the present specification, the numerical aperture NA of the objective lens on the optical information recording medium side (an image side) means the numerical aperture NA of the objective lens through which the light flux pass the lens surface positioned to be closest to the optical information recording medium. Further, in the present specification, the necessary numerical aperture NA means the numerical aperture which is regulated by the standard of each optical information recording medium, or means the numerical aperture of the objective lens having the diffractive limit power which can obtain the spot diameter necessary to perform recording or reproduction of information for each of the optical information recording media, in accordance with the wavelength of the light source to be used.

In the present specification, the second optical information recording medium means the optical disks of various CD groups representing, for example, CD-R, CD-RW, CD-Video and CD-ROM, while the first optical information recording medium means the optical disks of various DVD groups representing DVD-ROM, DVD-RAM, DVD-R, DVD-RW and DVD-Video. Still further, in the present specification, when the thickness t of the transparent base board is mentioned, it includes the case of t=0.

In this specification, the information recording and/or reproduction means to record information on the information recording surface of the optical information recording medium as mentioned above, and/or to reproduce information recorded on the information recording surface. The optical pick-up device of the invention can be used for either the recording only or the reproduction only, or for both of the recording and the reproduction. Further, the optical pick-up device of the invention can be used for either the recording for one information recording medium and the reproduction for the other information recording medium, or for the recording or the reproduction for one information recording medium and for the recording and reproduction for the other information recording medium. Incidentally, the reproduction in this case includes only reading of information.

DETAILED DESCRIPTION OF THE PREFERRED EMBODIMENT

Referring to the drawings, the preferable embodiment of the invention will be explained as follows.

The diffractive surface is expressed by a basic aspheric surface showing a macroscopic shape from which a diffractive relief is removed, and by the optical path difference function. The optical path difference function shows the optical path difference that is given to the diffracted light having the prescribed order number for the prescribed designing wavelength by the diffractive surface, and provides a diffractive ring-shaped zone by the change mλ (m is a diffraction order number) of the value of the optical path difference function.

The optical path difference function Φ (h) is expressed by the following formula.

$$\Phi(h) = (b0 + b2 \times h^2 + b4 \times h^4 + b6 \times h^6 + \ldots) \times \lambda \qquad (1)$$

where, h: distance from the optical axis b0, b2, b4, b6, . . . : coefficients of the optical path difference function On the other hand, the aspheric surface is expressed by the following function.

$$X = \frac{\frac{h^2}{r}}{1 + \sqrt{1 - (1+k)\frac{h^2}{r^2}}} + A0 + A2 \times h^2 + A4 \times h^4 + A6 \times h^6 \qquad (2)$$

where,

A0, A2, A4, A6, . . . : coefficients of the aspheric surface k: constant of the cone r: paraxial radius of curvature Further, r, d, n and vd are radius of curvature, surface separation, refractive index and Abbe's number of the lens, respectively.

Based upon the above definition, the lens can be given power, when the second-order coefficient of the optical path difference function is set to be non-zero value. Further, the spherical aberration can be controlled, when the coefficients which are not the second-order of the optical path difference function, but are the 4th, 6th, 8th and 10th order coefficients are set to be non-zero value. Incidentally, in this case, controlling means correction of the spherical aberration in the part having refractive power, by the generation of the opposite spherical aberration, or means adjustment to make the whole spherical aberration to be the desired value.

EXAMPLE 1

Figure 4:
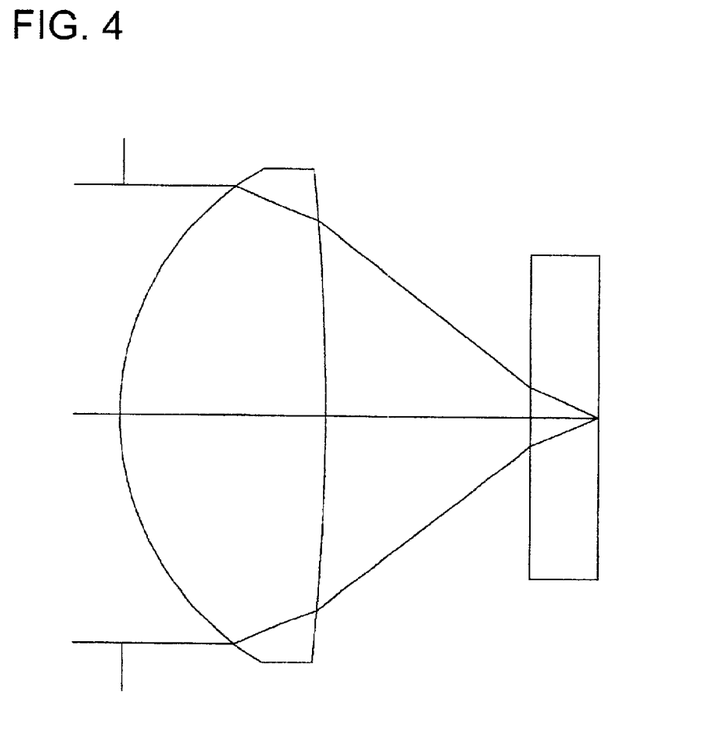
FIG. 4 shows the section of the objective lens of the Examples 1 and 2.
Figure 5:
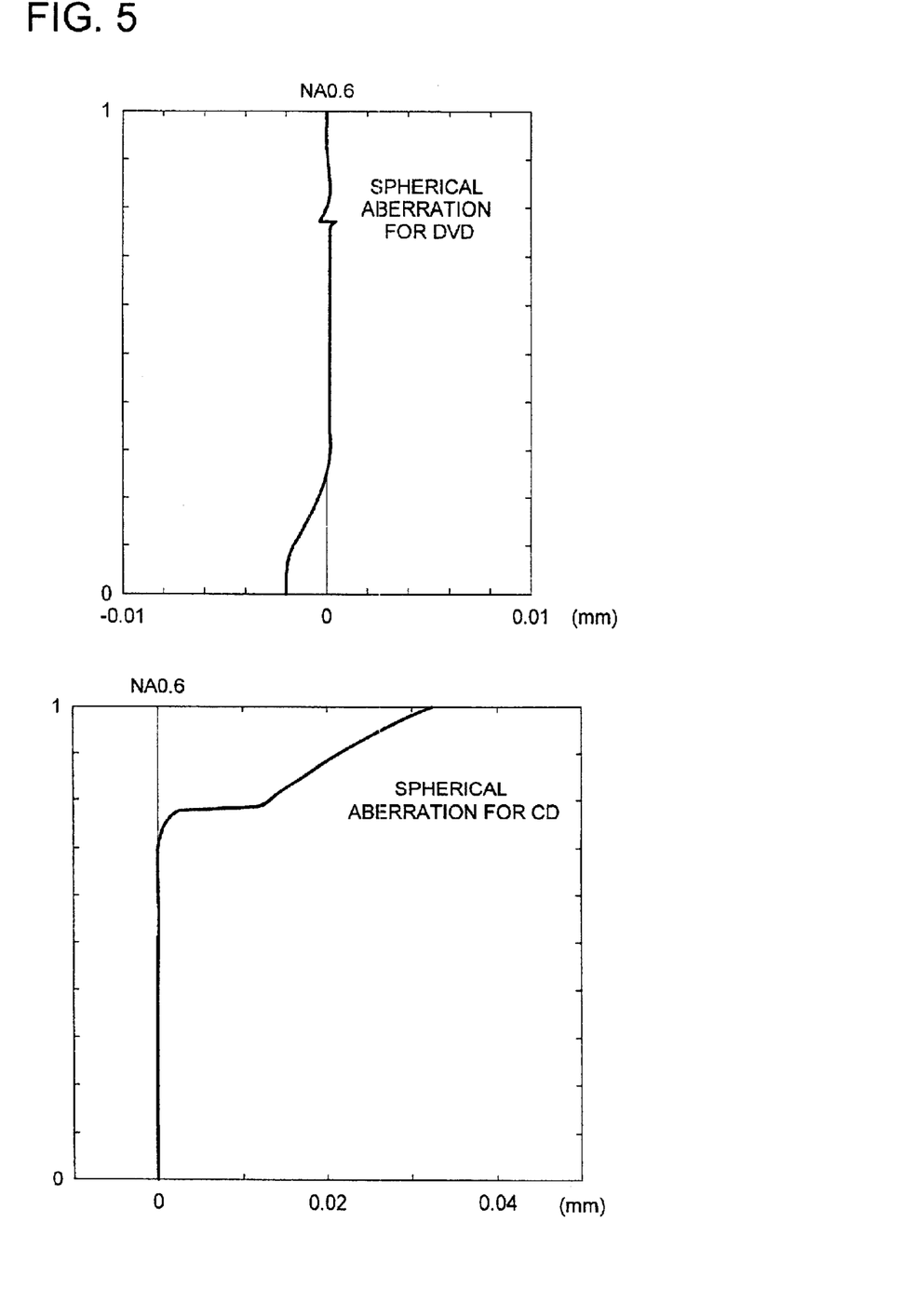
FIG. 5 shows the drawings of the spherical aberration of the objective lens of the Example 1.

FIG. 4 shows the section of the objective lens of the Examples 1 and 2. FIG. 5 shows the drawings of the spherical aberration of the objective lens of the Example 1. Further, Table 1 shows the lens data of the objective lens of the Example 1. In this objective lens, the first surface is provided with the diffractive structures on the central area corresponding to the area up to the numerical aperture NA2 including the optical axis, and on the peripheral area corresponding to the area covering in terms of numerical aperture from NA2 to NA1 respectively.

TABLE 1

(Example 1)

when light source wavelength $\lambda 1 = 655$ nm
focal length f = 3.05,
image side numerical aperture = 0.6 (necessary numerical aperture NA1 = 0.6)
when light source wavelength $\lambda 2 = 785$ nm
focal length f = 3.07,
image side numerical aperture = 0.6 (necessary numerical aperture NA2 = 0.47)

| No | R | d1 | d2 | n1 | N2 |
|---|---|---|---|---|---|
| Object point | | ∞ | ∞ | | |
| 1 (aspheric surface 1, diffractive surface) | As follows | 1.72 | 1.72 | 1.5409 | 1.5372 |
| 2 (aspheric surface 2) | −8.4895 | 1.70 | 1.34 | | |
| 3 (cover glass) | ∞ | 0.6 | 1.2 | 1.5775 | 1.5706 |
| 4 | ∞ | | | | |

Suffix 1 means the case $\lambda 1 = 655$ nm,
Suffix 2 means the case $\lambda 2 = 785$ nm,
NA1 = 0.60
NA2 = 0.47
The first surface
When h ≦ 1.421 (numeral 1.421 is the distance from the optical axis corresponding to NA1)
r = 1.90222
aspherical coefficient k = −2.389719
A4 = 0.295732E − 01
A6 = −0.445906E − 03
A8 = −0.182777E − 02
A10 = 0.529511E − 03
A12 = −0.483804E − 04
A14 = 0.536708E − 05
Coefficient of the optical path difference function b2 = 0
b4 = −0.511690E + 01
b6 = 0.280128E + 1
b8 = −0.156065E + 01
b10 = 0.290304E + 00
when 1.421 ≦ h
r = 2.0419
aspherical coefficient k = −0.405039
A0 = 0.3292E − 2

TABLE 1-continued

A4 = 0.147184E − 01
A6 = −0.801110E − 02
A8 = 0.178291E − 02
A10 = −0.228390E − 03
A12 = 0.247574E −04
A14 = −0.378447E − 05
Coefficient of the optical path difference function b2 = −0.382807E + 01
b4 = −0.335906E + 01
b6 = 0.172276E + 01
b8 = −0.522086E + 00
b10 = 0.572437E − 01
The second surface
aspherical coefficient k = 0.097420
A4 = 2.60715E − 02
A6 = −1.68385E − 02
A8 = 7.51325E − 03
A10 = −1.81130E − 03
A12 = 1.79855E − 04
A14 = −2.22237E − 06

The objective lens of the Example 1 is one that is used for the recording and/or reproduction of information for DVD and CD with the wavelengths 655 nm and 785 nm, respectively. The objective lens is provided with the diffractive ring-shaped zones on all of the first surface on the light source side, and the optical axial section including the optical axis of the diffractive ring-shaped zone is blazed to be a saw-tooth shape.

Further, each of the diffractive ring-shaped zones is blazed for each of the light fluxes for DVD and CD so as to use diffracted light of the same order number, and thereby the spherical aberration generated by the difference of the base board thicknesses between DVD and CD is corrected, by using the difference of the spherical aberrations generated by the difference of the wavelengths.

In the objective lens, it is assumed that the necessary numerical aperture NA1 (the first necessary numerical aperture) is 0.60 for the recording and/or reproduction for DVD, with the wavelength 655 nm, and that the necessary numerical aperture NA2 (the second necessary numerical aperture) is 0.47 for the recording and/or reproduction for CD, with the wavelength 785 nm. Further, for the light flux having the wavelength 785 nm, the objective lens makes the light flux whose numerical aperture NA is not less than 0.47 to generate the spherical aberration to be flare, on the information recording surface for CD.

On each of the diffractive ring-shaped zones, the wavelength, which gives the maximum diffractive efficiency for the diffracted light having the prescribed order number, is called the blazing wavelength.

In the objective lens of the example, the first-order diffracted light has the highest diffraction efficiency, for the light flux having the blazing wavelength.

The example gives the different characteristics to the diffractive surfaces in the central area corresponding to the area up to the numerical aperture NA2 (0.47) including the optical axis, and in the peripheral area corresponding to the area covering in terms of the numerical aperture from NA2 to NA1, and in this case, in order to prevent the occurrence of the phase shift of the wave front, either of the following methods can be used.

The first method is to equalize the blazing wavelength in the central area with the blazing wavelength in the peripheral area. The sectional view and the wave front aberration of DVD side become similar to those shown in FIG. 2(a) and FIG. 2(b) respectively in this case. However, the phase shift representing integer multiples of $2\pi$ in the wave front aberration is omitted, because it does not affect the image formation.

The second method is to equalize the wave front phase of each of the ring-shaped zones in the optical axial section, for the light rays passing through the position where the depth of the diffractive ring-shaped zone is a half of the step between the ring-shaped zones, though the blazing wavelengths in the central area is different from that in the peripheral area.

EXAMPLE 2

Figure 6:
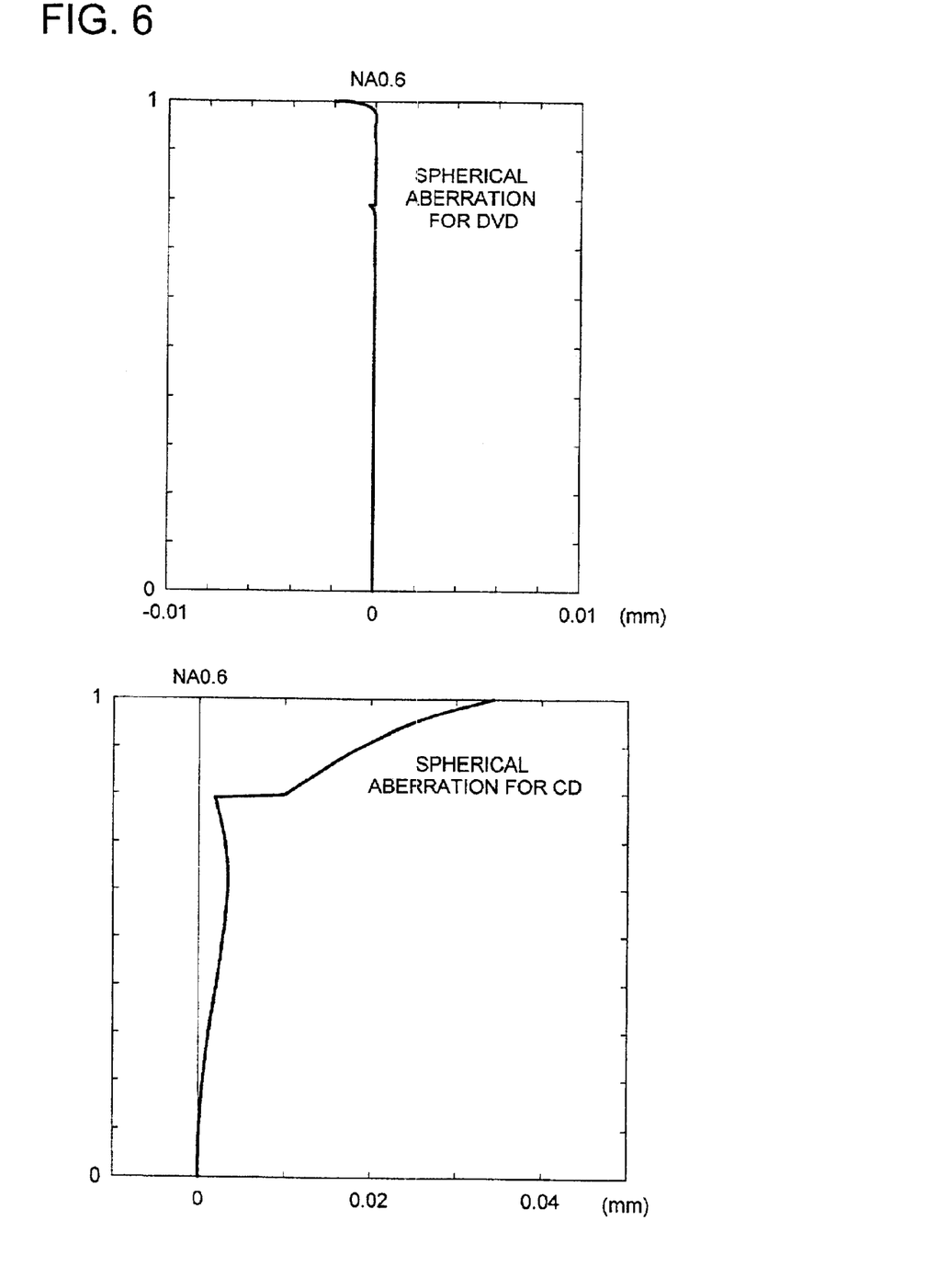
FIG. 6 shows the drawings of the spherical aberration of the objective lens of the Example 2.

FIG. 6 is a drawing of the spherical aberration of the objective lens of the Example 2. Table 2 shows the lens data of the objective lens of the Example 2. In the example, the objective lens forms the diffractive structure on both of the central area corresponding to the numerical aperture NA2 including the optical axis, and the peripheral area corresponding to the numerical aperture from NA2 to NA1. The example establishes the lens data so adequately that the third spherical aberration and the fifth spherical aberration are intentionally established to be $-0.011\lambda$ WFE rms, and $0.008\lambda$ WFE rms respectively, for DVD representing the first optical information recording medium, while the third spherical aberration and the fifth spherical aberration are intentionally established to be $0.010\lambda$ WFE rms, and $-0.008\lambda$ WFE rms respectively, for CD representing the second optical information recording medium. Incidentally, the first surface of the objective lens is provided with the diffractive structures in both of the central area corresponding to the numerical aperture NA2 including the optical axis, and the peripheral area corresponding to the numerical aperture from NA2 to NA1, respectively.

TABLE 2

(Example 2)

when light source wavelength $\lambda 1 = 655$ nm
focal length f = 3.36,
image side numerical aperture = 0.6 (necessary numerical aperture NA1 = 0.6)
when light source wavelength $\lambda 2 = 788$ nm
focal length f = 3.38,
image side numerical aperture = 0.6 (necessary numerical aperture NA2 = 0.47)

| No | R | d1 | d2 | n1 | N2 |
|---|---|---|---|---|---|
| Object point | ∞ | ∞ | | | |
| 1 (aspheric surface 1, diffractive surface) | As follows | 2.2 | 2.2 | 1.5409 | 1.5371 |
| 2 (aspheric surface 2) | −7.58221 | 1.77 | 1.31 | | |
| 3 (cover glass) | ∞ | 0.6 | 1.2 | 1.5775 | 1.5706 |
| 4 | ∞ | | | | |

Suffix 1 means the case $\lambda 1 = 655$ nm,
Suffix 2 means the case $\lambda 2 = 788$ nm,
NA1 = 0.60
NA2 = 0.47
The first surface
When h ≦ 1.589 (numeral 1.589 is the distance from the optical axis corresponding to NA1)
r = 2.14712
aspherical coefficient k = −2.155102
A4 = 0.207599E − 01
A6 = −0.171907E − 02

TABLE 2-continued

A8 = 0.198251E − 03
A10 = −0.321847E − 04
Coefficient of the optical path difference function b2 = 0
b4 = −0.113873E + 01
b6 = 0.172378E − 01
b8 = 0.103857E + 00
b10 = 0.117255E − 01
when 1.589h ≦ h
r = 2.04118
aspherical coefficient k = −0.949760
A4 = −0.698492E − 02
A6 = 0.247667E − 02
A8 = 0.844143E − 03
A10 = −0.307130E − 03
A12 = 0.972309E − 05
A14 = 0.283698E − 05
Coefficient of the optical path difference function b2 = 0.150087E + 02
b4 = −0.212674E + 02
b6 = 0.939532E + 01
b8 = −0.195177E + 01
b10 = 0.153761E + 00
The second surface
aspherical coefficient k = 13.843738
A4 = 2.70130E − 02
A6 = −9.54051E − 03
A8 = 4.63590E − 03
A10 = −1.79121E − 03
A12 = 3.95718E − 04
A14 = −3.00636E − 05

Figure 7:
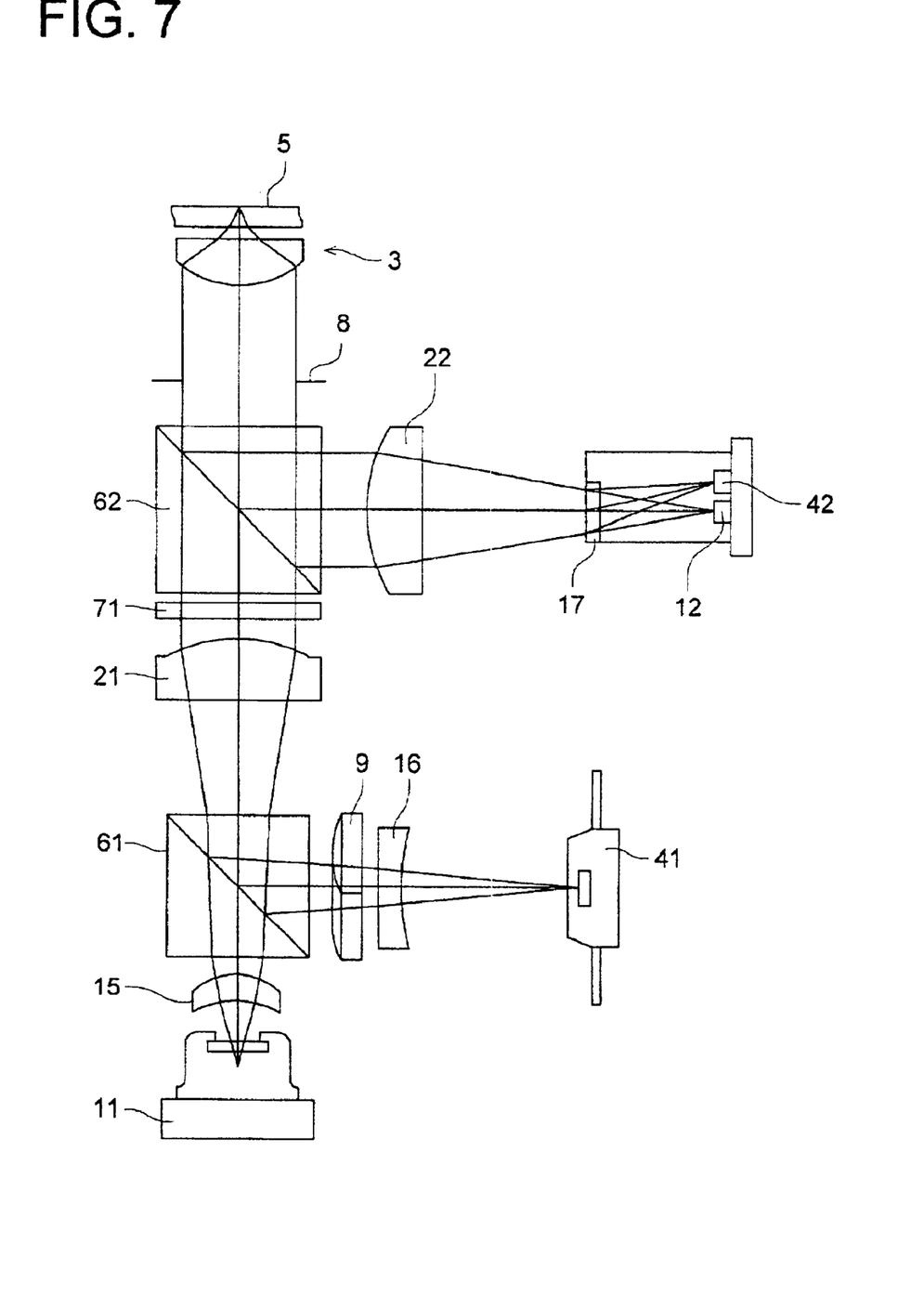
FIG. 7 is a schematic structural drawing of the optical pick-up device which can use objective lens 3 of the Examples 1 and 2.

FIG. 7 is a schematic structural drawing of the optical pick-up device which can use objective lens 3 of the above-mentioned Examples 1 and 2. In FIG. 7, the optical pick-up device is provided with first light source 11 for performing the information recording and/or reproduction for the first optical information recording medium (DVD, for example), and second light source 12 for performing the information recording and/or reproduction for the second optical information recording medium (CD, for example) and having different wavelength from the first light source 11, and is further provided with coupling lenses 21 and 22 which convert the divergent angles of the diverged light fluxes emitted from each of the light sources to the desired divergent angles, beam splitter 62 representing the light combining means which combines the above-mentioned light fluxes so as to travel in nearly one direction, objective lens 3 which converges the light flux from the beam splitter 62 on information recording surface 5 of the optical information recording medium, and optical detectors 41 and 42 which receive reflected light from the optical information recording medium. In FIG. 7, numeral 8 is a diaphragm, numeral 9 is a cylindrical lens, numeral 71 is a quarter wavelength plate, numeral 15 is a coupling lens to decrease the divergent degree of diverged light from the light source 11, numeral 16 is a concave lens, numeral 17 is a hologram to separate the reflected light flux, and numeral 61 is a beam splitter which directs reflected light from the information recording surface to optical detector 41.

The invention can provide the optical pick-up device and the objective lens which can control the phase shift of the wave front, in the objective lens which is used commonly for the recording and/or reproduction for the different optical information recording media such as CD and DVD.

Further, the invention can provide the optical pick-up device and the objective lens whose characteristic of the wave front aberration is made to be better, in the objective lens which is used commonly for the recording and/or reproduction for the different optical information recording media such as CD and DVD.

Still further, the invention can provide the optical pick-up device and the objective lens which can increase the spot light amount for the optical information recording medium whose base board thickness is thick like CD, for example, in the objective lens which is used commonly for the recording and/or reproduction for the different optical information recording media such as CD and DVD.

What is claimed is:

1. An optical pickup apparatus, comprising:
   a first light source to emit a first light flux having a wavelength $\lambda 1$;
   a second light source to emit a second light flux having a wavelength $\lambda 2$ ($\lambda 1 < \lambda 2$);
   a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;
   the converging optical system including an objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);
   the objective lens comprising:
      a central region provided from an optical axis to a position corresponding to the second necessary numerical aperture and a peripheral region provided at an outside of the central region on at least one optical surface of the objective lens;
      a diffractive structure including a diffractive ring-shaped zones which is blazed on a basis of a wavelength $\lambda 0$ ($\lambda 1 < \lambda 0 < \lambda 2$) and is formed on each of the central region and the peripheral region; and
      a phase difference suppressing structure to suppress a phase difference between a wavefront of a light flux passing the central region and a wavefront of a light flux passing the peripheral region when recording or reproducing information is conducted for the first optical information recording medium.

2. The optical pickup apparatus of claim 1, wherein the objective lens comprises a stepped section between an imaginary enveloping surface connecting axial tip ends of the diffractive ring-shaped zones of the central region and an imaginary enveloping surface connecting axial tip ends of the diffractive ring-shaped zones of the peripheral region and the distance of the stepped region is 1 $\mu$m to 10 $\mu$m.

3. The optical pickup apparatus of claim 1, wherein a phase difference between the wavefront of a light flux passing the central region and the wavefront of a light flux passing the peripheral region is 0.05 $\lambda 1$ or less.

4. An optical pickup apparatus, comprising:
   a first light source to emit a first light flux having a wavelength $\lambda 1$;
   a second light source to emit a second light flux having a wavelength $\lambda 2$ ($\lambda 1 < \lambda 2$);
   a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;
   the converging optical system including an objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);
   the objective lens comprising:
      a central region provided from an optical axis to a position corresponding to the second necessary numerical aperture and a peripheral region provided at an outside of the central region on at least one optical surface of the objective lens, wherein a central diffractive structure having diffractive ring-shaped zones blazed on a basis of the wavelength $\lambda 0$ ($\lambda 1 < \lambda 0 < \lambda 2$) is formed on the central region and a peripheral diffractive structure having diffractive ring-shaped zones blazed on a basis of the wavelength $\lambda 0'$ ($\lambda 0' < \lambda 0$) is formed on the peripheral region; and
      wherein an imaginary enveloping surface connecting axial tip ends of the diffractive ring-shaped zones of the central diffractive structure is discontinuous to an imaginary enveloping surface connecting axial tip ends of the diffractive ring-shaped zones of the peripheral central diffractive structure.

5. The optical pickup apparatus of claim 4, wherein the objective lens comprises a stepped section between an imaginary enveloping surface connecting axial tip ends of the diffractive ring-shaped zones of the central diffractive structure and an imaginary enveloping surface connecting axial tip ends of the diffractive ring-shaped zones of the peripheral diffractive structure and the distance of the stepped region is 1 $\mu$m to 10 $\mu$m.

6. The optical pickup apparatus of claim 4, wherein a phase difference between the wavefront of a light flux passing the central region and the wavefront of a light flux passing the peripheral region is 0.05 $\lambda 1$ or less.

7. An optical pickup apparatus, comprising:
   a first light source to emit a first light flux having a wavelength $\lambda 1$;
   a second light source to emit a second light flux having a wavelength $\lambda 2$ ($\lambda 1 < \lambda 2$);
   a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2 ) is conducted by using the second light source and the converging optical system;

the converging optical system including an objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);

the objective lens comprising:
  a central region provided from an optical axis to a position corresponding to the second necessary numerical aperture and a peripheral region provided at an outside of the central region on at least one optical surface of the objective lens;
  a central diffractive structure including a diffractive ring-shaped zones blazed on a basis of a wavelength $\lambda 0$ ($\lambda 1 < \lambda 0 < \lambda 2$) formed on the central region; and
the objective lens structured so as to reduce at least one of a wavefront aberration caused by a difference between the wavelength $\lambda 1$ and the wavelength $\lambda 0$ when recording or reproducing information is conducted for the first optical information recording medium and a wavefront aberration caused by a difference between the wavelength $\lambda 2$ and the wavelength $\lambda 0$ when recording or reproducing information is conducted for the second optical information recording medium.

8. An optical pickup apparatus, comprising:
a first light source to emit a first light flux having a wavelength $\lambda 1$;
a second light source to emit a second light flux having a wavelength $\lambda 2$ ($\lambda 1 < \lambda 2$);
a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;

the converging optical system including an objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);

the objective lens comprising:
  a central region provided from an optical axis to a position corresponding to the second necessary numerical aperture and a peripheral region provided at an outside of the central region on at least one optical surface of the objective lens;
  a diffractive structure including a diffractive ring-shaped zones formed on each of the central region and the peripheral region, wherein the diffractive structure of the central region and at least a part of the diffractive structure of the peripheral region adjoining the central region are blazed on a basis of a wavelength $\lambda 0$ ($\lambda 1 < \lambda 0 < \lambda 2$).

9. An objective lens for use in an optical pickup apparatus which comprises
a first light source to emit a first light flux having a wavelength $\lambda 1$;
a second light source to emit a second light flux having a wavelength $\lambda 2$ ($\lambda 1 < \lambda 2$);
a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;

the converging optical system including the objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);

the objective lens comprising:
  a central region provided from an optical axis to a position corresponding to the second necessary numerical aperture and a peripheral region provided at an outside of the central region on at least one optical surface of the objective lens;
  a diffractive structure including a diffractive ring-shaped zones blazed on a basis of a wavelength $\lambda 0$ ($\lambda 1 < \lambda 0 < \lambda 2$) formed on each of the central region and the peripheral region; and
  a phase difference suppressing structure to suppress a phase difference between a wavefront of a light flux passing the central region and a wavefront of a light flux passing the peripheral region when recording or reproducing information is conducted for the first optical information recording medium.

10. The objective lens of claim 9, wherein the objective lens comprises a stepped section between an imaginary enveloping surface connecting axial tip ends of the diffractive ring-shaped zones of the central region and an imaginary enveloping surface connecting axial tip ends of the diffractive ring-shaped zones of the peripheral region and the distance of the stepped region is 1 µm to 10 µm.

11. The objective lens of claim 9, wherein a phase difference between the wavefront of a light flux passing the central region and the wavefront of a light flux passing the peripheral region is 0.05 $\lambda 1$ or less.

12. An objective lens for use in an optical pickup apparatus which comprises
a first light source to emit a first light flux having a wavelength $\lambda 1$;
a second light source to emit a second light flux having a wavelength $\lambda 2$ ($\lambda 1 < \lambda 2$);
a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;

the converging optical system including the objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);

the objective lens comprising:
a central region provided from an optical axis to a position corresponding to the second necessary numerical aperture and a peripheral region provided at an outside of the central region on at least one optical surface of the objective lens, wherein a central diffractive structure having diffractive ring-shaped zones blazed on a basis of the wavelength $\lambda 0$ ($\lambda 1 < \lambda 0 < \lambda 2$) is formed on the central region and a peripheral diffractive structure having diffractive ring-shaped zones blazed on a basis of the wavelength $\lambda 0'$ ($\lambda 0' < \lambda 0$) is formed on the peripheral region, and wherein an imaginary enveloping surface connecting axial tip ends of the diffractive ring-shaped zones of the central diffractive structure discontinues to an imaginary enveloping surface connecting axial tip ends of the diffractive ring-shaped zones of the peripheral central diffractive structure.

13. The objective lens of claim 12, wherein the objective lens comprises a stepped section between an imaginary enveloping surface connecting axial tip ends of the diffractive ring-shaped zones of the central diffractive structure and an imaginary enveloping surface connecting axial tip ends of the diffractive ring-shaped zones of the peripheral diffractive structure and the distance of the stepped region is 1 $\mu$m to 10 $\mu$m.

14. The objective lens of claim 12, wherein a phase difference between the wavefront of a light flux passing the central region and the wavefront of a light flux passing the peripheral region is 0.05 $\lambda 1$ or less.

15. An objective lens for use in an optical pickup apparatus which comprises
a first light source to emit a first light flux having a wavelength $\lambda 1$;
a second light source to emit a second light flux having a wavelength $\lambda 2$ ($\lambda 1 < \lambda 2$);
a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;

the converging optical system including an objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);

the objective lens comprising:
a central region provided from an optical axis to a position corresponding to the second necessary numerical aperture and a peripheral region provided at an outside of the central region on at least one optical surface of the objective lens;
a central diffractive structure including a diffractive ring-shaped zones blazed on a basis of a wavelength $\lambda 0$ ($\lambda 1 < \lambda 0 < \lambda 2$) formed on the central region; and the objective lens structured so as to reduce at least one of a wavefront aberration caused by a difference between the wavelength $\lambda 1$ and the wavelength $\lambda 0$ when recording or reproducing information is conducted for the first optical information recording medium and a wavefront aberration caused by a difference between the wavelength $\lambda 2$ and the wavelength $\lambda 0$ when recording or reproducing information is conducted for the second optical information recording medium.

16. An objective lens for use in an optical pickup apparatus which comprises
a first light source to emit a first light flux having a wavelength $\lambda 1$;
a second light source to emit a second light flux having a wavelength $\lambda 2$ ($\lambda 1 < \lambda 2$);
a converging optical system to converge the first or second light flux on a information recording plane in such a way that recording or reproducing information for a first optical information recording medium with a transparent base board having a thickness t1 is conducted by using the first light source and the converging optical system and recording or reproducing information for a second optical information recording medium with a transparent base board having a thickness t2 (t1<t2) is conducted by using the second light source and the converging optical system;

the converging optical system including an objective lens, wherein a first necessary numerical aperture of the objective lens to conduct recording or reproducing information for a first optical information recording medium is NA1 and a second necessary numerical aperture of the objective lens to conduct recording or reproducing information for a second optical information recording medium is NA2 (NA1>NA2);

the objective lens comprising:
a central region provided from an optical axis to a position corresponding to the second necessary numerical aperture and a peripheral region provided at an outside of the central region on at least one optical surface of the objective lens;
a diffractive structure including a diffractive ring-shaped zones formed on each of the central region and the peripheral region, wherein the diffractive structure of the central region and at least a part of the diffractive structure of the peripheral region adjoining the central region are blazed on a basis of a wavelength $\lambda 0$ ($\lambda 1 < \lambda 0 < \lambda 2$).

* * * * *